Nov. 10, 1931.  C. J. KIENZLE  1,830,840

CLUTCH SHIFTING MECHANISM

Filed Nov. 30, 1928

Patented Nov. 10, 1931

1,830,840

UNITED STATES PATENT OFFICE

CHARLES J. KIENZLE, OF COLUMBUS, OHIO, ASSIGNOR TO THE JEFFREY MANUFACTURING COMPANY, OF COLUMBUS, OHIO, A CORPORATION OF OHIO

CLUTCH SHIFTING MECHANISM

Application filed November 30, 1928. Serial No. 322,888.

My present invention relates to certain new and useful improvements in clutch shifting mechanism adapted to shift the movable member of a jaw clutch into or out of engagement with its cooperating member and to hold said members in the preferred relation to each other. The invention is particularly applicable in connection with the cutter chain sprocket drive shaft of a mining machine.

The especial object of this invention is to provide a simple and efficient mechanism of the class described which is conveniently adjustable to provide for the accurate positioning of the parts both in original assembly and to compensate for wear of the parts.

The means whereby I attain this object are fully set forth in the following specification and illustrated in the accompanying drawings of which Fig. 1 is a fragmentary sectional view of a mining machine equipped with the devices of my invention.

Like numerals refer to similar parts in the several figures.

Figure 1:
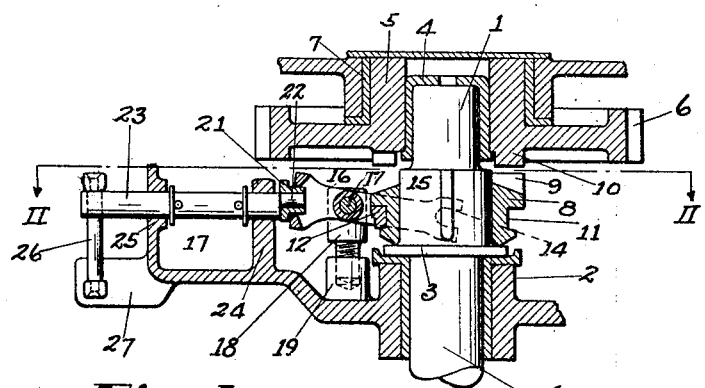
Figure 2:
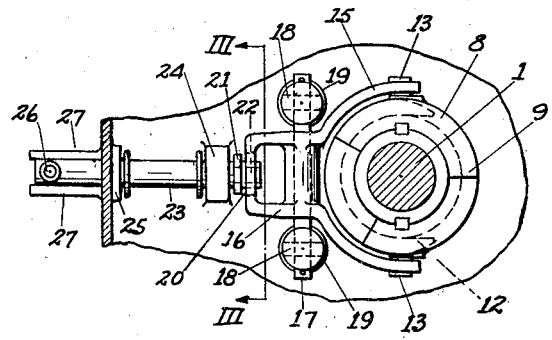
Fig. 2 is a sectional view taken along the line II—II of Fig. 1.
Figure 3:
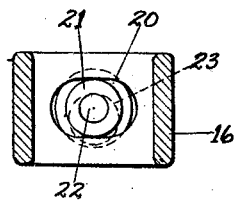
Fig. 3 is a sectional view taken along the line III—III of Fig. 2.

As shown in the drawings the numeral 1 refers to a shaft which, as here shown, is vertically disposed and is journaled in a bearing 2 and vertically supported by an annular flange 3 in engagement with the upper end of the bearing 2. The upper end of the shaft 1 is journaled in a bearing 4 formed in the hub 5 of a gear wheel 6 the circumferential surface of which is finished to form a journal rotatable in a bearing 7 of the supporting structure. A clutch member 8 splined to the shaft 1 is provided with suitable clutch teeth 9 adapted to cooperate with similar clutch teeth 10 formed on the lower end of the hub 5 to operatively connect the gear wheel 6 with the shaft 1. When the clutch teeth 9 and 10 are in engagement power may be applied to the gear wheel 6 to rotate the shaft 1, or power may be applied to the shaft 1 to rotate the gear wheel 6 as may be desired for the specific conditions of operation.

Formed in the clutch member 8 is an annular groove 11 in which is positioned a shifting yoke 12 having two outwardly projecting lugs 13 which extend into the notches 14 formed in the ends of the arms 15 of the shifting lever 16. The shifting lever 16 is pivotally supported upon the pivot pin 17 which projects through suitable apertures in the supporting studs 18, which are screw threaded into suitable bosses 19 of the supporting structure. The upper ends of studs 18 are provided with rectangularly intersecting diametrical bores in which pin 17 is adapted to be received and retained by means of cotter pins. It will be evident that upon removal of pin 17, studs 18 may be adjusted upwardly or downwardly by quarter turns and pin 17 reinserted in the aligned bores. The shifting lever 16 extends outwardly of its pivotal support and is provided with a transversely extending slotted aperture 20 into which projects a thimble 21 journaled upon a crank pin 22 which is formed at the end of the operating shaft 23. The shaft 23 is journaled in suitable bearings 24 and 25 of the supporting structure, and is pierced at its outer end by a transversely extending aperture through which extends the operating handle 26. The handle 26 is longitudinally slidable in said aperture and is adapted to engage a flange 27 of the supporting structure to secure the shaft 23 in the preferred position of rotary adjustment.

When it is desired to shift the clutch member 8 the handle 26 will be moved longitudinally to avoid the flange 27 and is then available to cause rotation of the shaft 23. By rotation of the shaft 23 the crank pin 22 acts upon the outer end of the shifting lever 16 to rotate said lever about its pivotal support and thereby move the clutch member 8 longitudinally of the shaft 1. By the screw adjustment of the supporting studs 18 the pivot pin 17 may be so adjusted that when the crank pin 22 is in its lowermost position the clutch teeth 9 and 10 will be firmly engaged to operatively connect the gear 6 with the shaft 1, and when said crank pin is in its highest position said teeth will avoid such engagement thereby releasing said gear from said shaft. The proportions of these parts are such that the handle 26 may be placed in engagement with the flange 27 to retain the clutch member in either of these positions.

It is to be understood that I do not limit myself to the precise construction here shown since it is obvious that the mechanism may be subject to wide variation as to details without departure from the spirit of my invention.

What I claim is:

1. In a mining machine, the combination with a clutch, of clutch operating means including a horizontally disposed shaft journalled in bearings of the machine with one end projecting beyond a lateral wall of the machine, said shaft being operable in a half rotation to engage and disengage the clutch, and means to lock said shaft at the limits of said half rotation with the clutch in engaged or disengaged position, said last named means comprising a headed bar slidable in an aperture in the projecting end of said shaft, and lugs on the machine below said shaft between which the lower end of said bar is engageable.

2. Supporting means for a clutch shifting lever, said means comprising a pair of spaced parallel studs threaded at their same ends in receiving apertures formed in a machine frame, the other ends of said studs having aligned diametrical bores, a removable pin passed through said bores and through a transverse bore of the lever, said studs being longitudinally adjustable relative to the frame upon removal of said pin.

3. Supporting means for a clutch shifting lever, said means comprising a pair of spaced parallel studs threaded at their same ends in receiving apertures formed in a machine frame, the other ends of said studs having aligned diametrical bores, a removable pin passed through said bores and through a transverse bore of the lever, the lever being disposed between the studs, said studs being longitudinally adjustable relative to the frame upon removal of said pin.

In testimony whereof I have hereunto set my hand.

CHARLES J. KIENZLE.